US012659836B2

(12) United States Patent
Sempere et al.

(10) Patent No.: US 12,659,836 B2
(45) Date of Patent: Jun. 16, 2026

(54) SYSTEMS AND METHODS FOR PERFORMING ACCESS CONTROL

(71) Applicant: Verizon Patent and Licensing Inc., Basking Ridge, NJ (US)

(72) Inventors: Raquel Morera Sempere, Weehawken, NJ (US); Sudhakar Reddy Patil, Flower Mound, TX (US); Violeta Cakulev, Millburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 976 days.

(21) Appl. No.: 17/809,751

(22) Filed: Jun. 29, 2022

(65) Prior Publication Data
US 2024/0007931 A1     Jan. 4, 2024

(51) Int. Cl.
*H04W 4/00*     (2018.01)
*H04W 48/04*     (2009.01)
*H04W 60/00*     (2009.01)
*H04W 64/00*     (2009.01)

(52) U.S. Cl.
CPC ........... *H04W 48/04* (2013.01); *H04W 60/00* (2013.01); *H04W 64/00* (2013.01)

(58) Field of Classification Search
None
See application file for complete search history.

(56) References Cited

U.S. PATENT DOCUMENTS

2023/0109664 A1* 4/2023 Gundavelli .......... H04W 76/10
455/411

FOREIGN PATENT DOCUMENTS

WO     WO-2022180617 A1 * 9/2022 ............. H04L 63/10
WO     WO-2023177791 A1 * 9/2023 ............. H04W 24/02

OTHER PUBLICATIONS

Technical Specification: 3GPP TS 23.501 V17.4.0 (Mar. 2022). 3rd Generation Partnership Project; Technical Specification Group Services and System Aspects; System architecture for the 5G System (5GS); Stage 2 (Release 17), 567 pages.

* cited by examiner

*Primary Examiner* — Zewdu A Beyen

(57)     ABSTRACT

A method may include storing information identifying network slices associated with transmitting data in a network, information identifying a maximum number of user equipment (UE) devices that can be registered for each network slice and/or information identifying a maximum number of data sessions that can be established for each network slice based on locations or areas associated with the UE devices. The method may also include receiving, from a first UE device, a registration request or a request for a data session and identifying a first slice associated with the first UE device. The method may further include determining, based on a location or area associated with the first UE device, whether a maximum number of UE devices that can be registered for the first slice has been reached and/or a maximum number of data sessions that can be served by the first slice has been reached.

20 Claims, 5 Drawing Sheets

SLICE IDENTIFIER
310

UE LOCATION IDENTIFIER
320

DATABASE
330

SLICE ADMISSION CONTROLLER
340

COMMUNICATION LOGIC
350

SYSTEMS AND METHODS FOR PERFORMING ACCESS CONTROL

BACKGROUND INFORMATION

The concept of network slices within Fifth Generation (5G) networks is one of the benefits of 5G. Slices may be associated with specific performance requirements, such as a particular Quality of Service (QoS). However, when multiple users share resources, such as resources associated with a slice, the performance rendered by the network may depend on the number of users. For example, for a wireless network, performance of a network slice may depend on the number of active users of the slice.

Network functions, such as the Network Slice Admission Control Function (NSACF) may apply admission control policies with respect to network slices to limit the number of user devices registered per slice or the number of active protocol data unit (PDU) sessions per slice.

BRIEF DESCRIPTION OF THE DRAWINGS

FIG. 1 illustrates an exemplary environment in which systems and methods described herein may be implemented;

DETAILED DESCRIPTION OF EXAMPLE EMBODIMENTS

Figure 2:
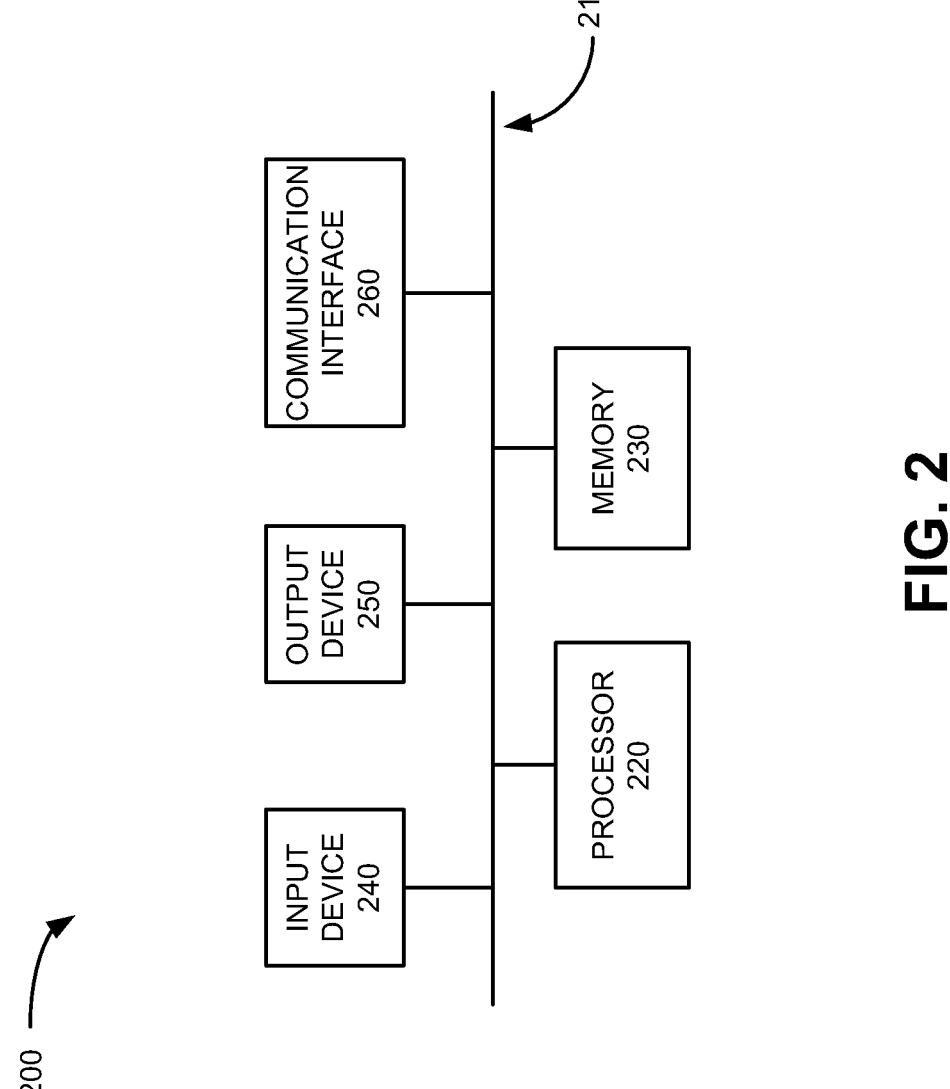
FIG. 2 is a block diagram of components implemented in one or more of the elements of the environment of FIG. 1 in accordance with an exemplary implementation.

The following detailed description refers to the accompanying drawings. The same reference numbers in different drawings may identify the same or similar elements.

Implementations described herein provide location-based granularity with respect to the number of user devices or data sessions allowed for a network slice. For example, the number of user equipment (UE) devices allowed to register for a particular network slice and/or the number of protocol data unit (PDU) sessions supported by a network slice may be limited to a maximum number based on the location of the UE devices, such as the cell, sector, tracking area, registration area, service area, etc.

A Network Slice Admission Control Function (NSACF) may monitor the number of UE devices registered, the number of active PDU sessions and/or the number of QoS flows per network slice per cell, sector, tracking area, registration area, service area, etc., to ensure that the number of UE devices registered and/or the number of active PDU sessions does not exceed a maximum number. If the number of UE devices and/or PDU sessions/QoS flows for a slice would exceed the maximum number, the NSACF may apply admission control policies to prohibit use of a network slice by a UE device attempting to connect to the slice. In this manner, a service provider associated with a wireless network, transport network, and/or core network may provide access to a slice for a number of UE devices, while main-taining the desired QoS, service level agreements (SLAs) and/or other key performance indicators (KPIs) associated with the slice.

Figure 1:
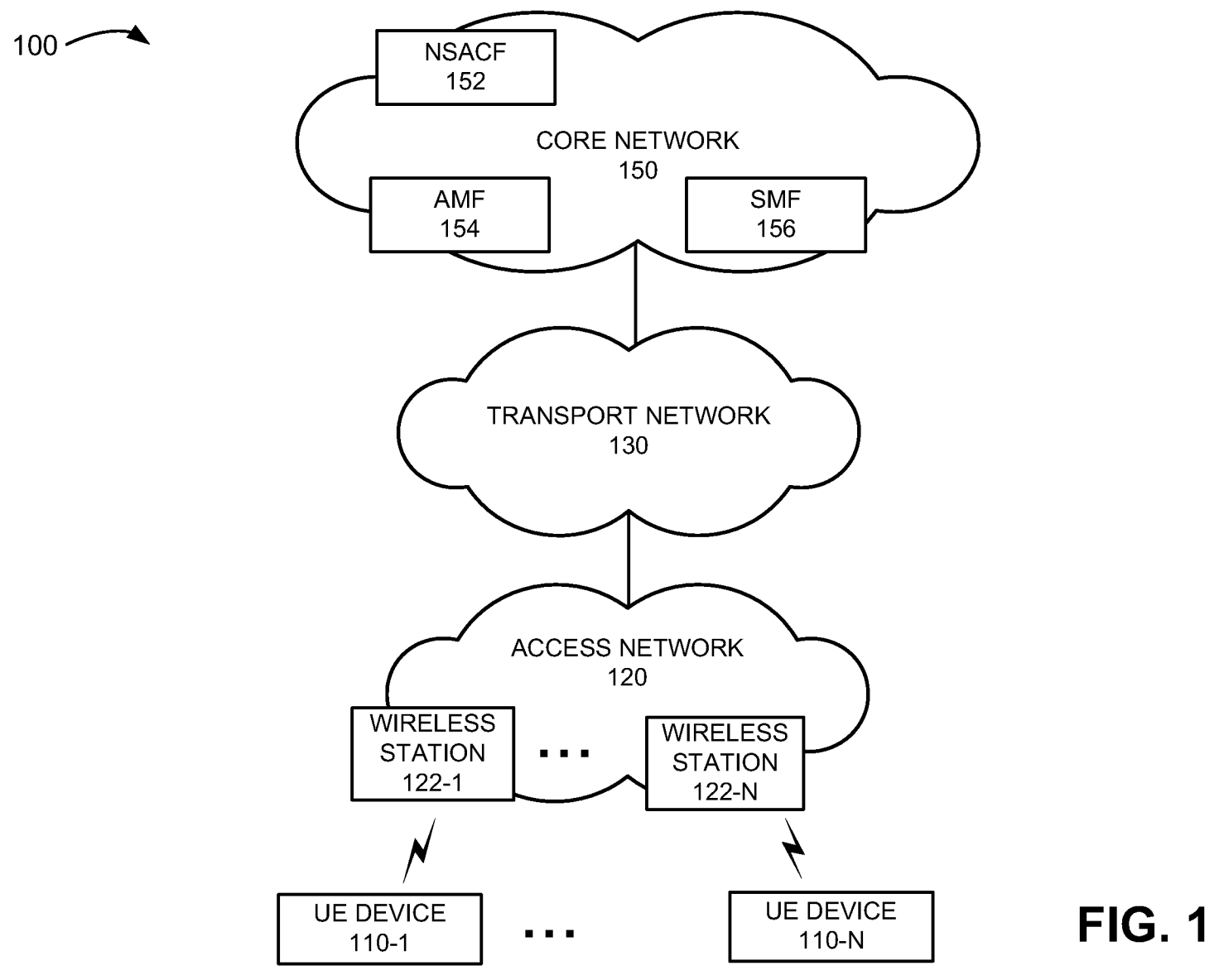

FIG. 1 is a diagram illustrating an exemplary environment 100 in which systems and methods described herein may be implemented. Referring to FIG. 1, environment 100 includes user equipment (UE) device 110-1 through 110-N, access network 120, wireless stations 122-1 through 122-N, transport network 130, core network 150, NSACF 152, Access and Mobility Management Function (AMF) 154 and Session Management Function (SMF) 156.

UE devices 110-1 and 110-N (referred to herein individually as UE device or UE 110, and collectively as UE devices or UEs 110) may include any computing device, such as a personal computer (PC), a laptop computer, a server, a tablet computer, a notebook, a Chromebook®, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, etc., that includes communication functionality. UE device 110-1 may connect to access network 120 via wireless station 122-1 and UE device 110-N may connect to access network 120 via wireless station 122-N. UE devices 110 may also connect to other devices in environment 100 via any conventional technique, such as wired, wireless, optical connections or a combination of these techniques. UE device 110 and the person associated with UE device 110 (e.g., the party holding or using UE device 110) may be referred to collectively as UE device 110 in the description below.

Access network 120 may provide access to transport network 130 for wireless devices, such as UE devices 110. Access network 120 may enable UE device 110 to connect to core network 150 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 150, a service or application layer network, a cloud network, a multi-access edge computing (MEC) network, a fog network, etc. Furthermore, access network 120 may enable a device in core network 150 to exchange data with UE device 110 using a non-IP data delivery method such as Data over Non-Access Stratum (DoNAS).

Access network 120 may include a 5G access network or another advanced network, such as a Fourth Generation (4G) network, a long term evolution (LTE) access network, a sixth Generation (6G) access network, etc. Additionally, access network 120 may include functionality such as a millimeter (mm)-wave Radio Access Network (RAN). Access network 120 may also support advanced or massive multiple-input and multiple-output (MIMO) antenna configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless stations 122 (referred to collectively as wireless stations 122 and individually as wireless station 122) may be included in access network 120. Each wireless station 122 may service a number of UE devices 110 and/or other user devices when the particular device is within radio frequency signal range of wireless station 122. In one implementation, wireless station 122 may include a 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. For example, wireless station 122 may include a massive MIMO configuration (e.g., an 8×8 antenna configuration, a 16×16 antenna configuration, a 256×256 antenna configuration, etc.) to allow for multiple transmissions to be sent to UE devices 110 in sequence or simultaneously. In other implementations, wireless station 122 may also include a 4G base station (e.g., an evolved NodeB (eNodeB)) or a 6G base station that communicates wirelessly with UEs 110 located within the radio frequency range of wireless station 122.

Transport network 130 may be associated with a service provider that provides UE devices 110 with access to core network 150. For example, transport network 130 may couple access network 120 to core network 150 and may include one or more wired, wireless and/or optical networks that are capable of receiving and transmitting information (e.g., voice and/or video signals/data). For example, transport network 130 may include one or more Ethernet networks, packet switched networks such as Internet Protocol/Multi-Protocol Label Switching (IP/MPLS) networks, Software Defined Networks (SDNs) or other type of packet networks. Transport network 130 may also include one or more satellite networks, one or more packet switched networks, such as an IP based network, a local area network (LAN), a personal area network (PAN), a WiFi network, a Bluetooth network, a wide area network (WAN), a 5G network, a 4G LTE network, a 4G LTE Advanced network, a 6G network, an intranet, the Internet, or another type of network that is capable of transmitting signals/data. Transport network 130 may provide packet-switched services to UE devices 110 to provide, for example, data, voice, and/or multimedia services.

Core network 150 may include one or more wired, wireless and/or optical networks that are capable of receiving and transmitting data, voice and/or video signals. For example, core network 150 may include one or more public switched telephone networks (PSTNs) or other type of switched network. Core network 150 may further include one or more satellite networks, one or more packet switched networks, such as an IP-based network, a software defined network (SDN), a local area network (LAN), a WiFi network, a Bluetooth network, a wide area network (WAN), a wireless WAN (WWAN), a 5G network, a 4G LTE Advanced network, a 6G network, an intranet, or another type of network that is capable of transmitting data. Core network 150 may provide packet-switched services and wireless IP connectivity to various components in environment 100, such as UE devices 110, to provide, for example, data, voice, and/or multimedia services.

In an exemplary implementation, core network 150 may include a number of network functions (NFs), such as NSACF 152, AMF 154 and SMF 156 as well as others.

Although only one NSACF 152, AMF 154 and SMF 156 are shown for simplicity, it should be understood that core network 150 may include a large number (e.g., dozens or more) of NSACFs 152, AMFs 154 and SMFs 156. For example, in some implementations, a number of NSACFs 152 may be geographically distributed in environment 100 to provide slice-related admission control, as described in detail below. In addition, in some implementations, NSACF 152, AMF 154 and/or SMF 156 may be located elsewhere in environment 100, such as in transport network 130.

NSACF 152 may monitor and control the number of UEs 110 that can register for each network slice. In an exemplary implementation, NSACF 152 may also monitor and control the number of UEs 110 permitted to register for a slice on a more granular level, such as based on the particular location of UEs 110. For example, NSACF 152 may control the number of UEs 110 permitted to register for a network slice for each cell, for each sector that may include a number of cells, for each tracking area which includes a number of cells or sectors grouped together, for each registration area that may include a number of tracking areas, for each service area associated with a service provider and/or associated with core network 150, or for some other location/area to limit the number of UEs 110 in that particular area/location permitted to register for a network slice. NSACF 152 may also monitor and control the number of PDU sessions that can be established per network slice for each cell, sector, tracking area, registration area, service area or for some other location/area. The term "session," as used herein, may refer to bidirectional communications between two endpoints.

In further implementations, NSACF 152 may monitor and control the number of QoS flows (e.g., data flows in which each flow is associated with a particular QoS) that can be established for each network slice for each cell, sector, tracking area, registration area, service area, etc. As used herein, the term "flow" may refer to unidirectional or bidirectional communications between source and destination endpoints. In some implementations, NSACF 152 may monitor and control the number of QoS flows associated with a specific 5G QoS Identifier (5QI) that can be established for each network slice for each cell, sector, tracking area, registration area, service area, etc. NSACF 152 may further support event based network slice status notification and provide reports to a consumer NF.

In an exemplary implementation, NSACF 152 may store information regarding slices implemented in environment 100. For example, NSACF 152 may store slice identifiers (IDs) along with QoS, SLA, key performance indicators (KPIs), etc., associated with slices in environment 100. The term "slice" or "network slice" as used herein refers to a logical network including a portion of an access network (e.g., a portion of access network 120), a portion of a transport network (e.g., a portion of transport network 130) and/or a portion of a core network (e.g., a portion of core network 150) that provides telecommunication services and network capabilities that can vary from slice to slice. Each network slice may be associated with a different type of services having different characteristics and requirements (e.g., latency, jitter, bandwidth, etc.). A service provider may provision network slices to UE devices 110 to provide network connectivity and data services for UE devices 110, as described in detail below.

AMF 154 may include logic to perform registration management, connection management, reachability management, mobility management, access authentication and authorization, location services management, and/or other management processes. SMF 156 may include logic to perform session establishment, session modification, and/or session release, perform IP address allocation and management, perform Dynamic Host Configuration Protocol (DHCP) functions, and/or perform other types of control plane processes for managing user plane data.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and wireless stations 122, as well as multiple transport networks 130 that connect UE devices 110 to core network 150. Environment 100 may also include elements, such as gateways, monitoring devices, network elements/ functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

FIG. 2 illustrates an exemplary configuration of a device 200. One or more devices 200 may correspond to or be included in devices in environment 100, such as UE device 110, wireless station 122, NSACF 152, AMF 154, SMF 156 and/or other devices included in environment 100. Referring to FIG. 2, device 200 may include bus 210, processor 220, memory 230, input device 240, output device 250 and communication interface 260. Bus 210 may include a path that permits communication among the elements of device 200. The exemplary configuration illustrated in FIG. 2 is provided for simplicity. It should be understood that device 200 may include more or fewer components than illustrated in FIG. 2.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250.

Communication interface 260 may include one or more transceivers that device 200 uses to communicate with other devices via wired, wireless or optical mechanisms. For example, communication interface 260 may include one or more RF transmitters, receivers and/or transceivers and one or more antennas for transmitting and receiving RF data. Communication interface 260 may also include a modem or an Ethernet interface to a LAN or other mechanisms for communicating with elements in a network.

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), solid state drive (SSD), etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
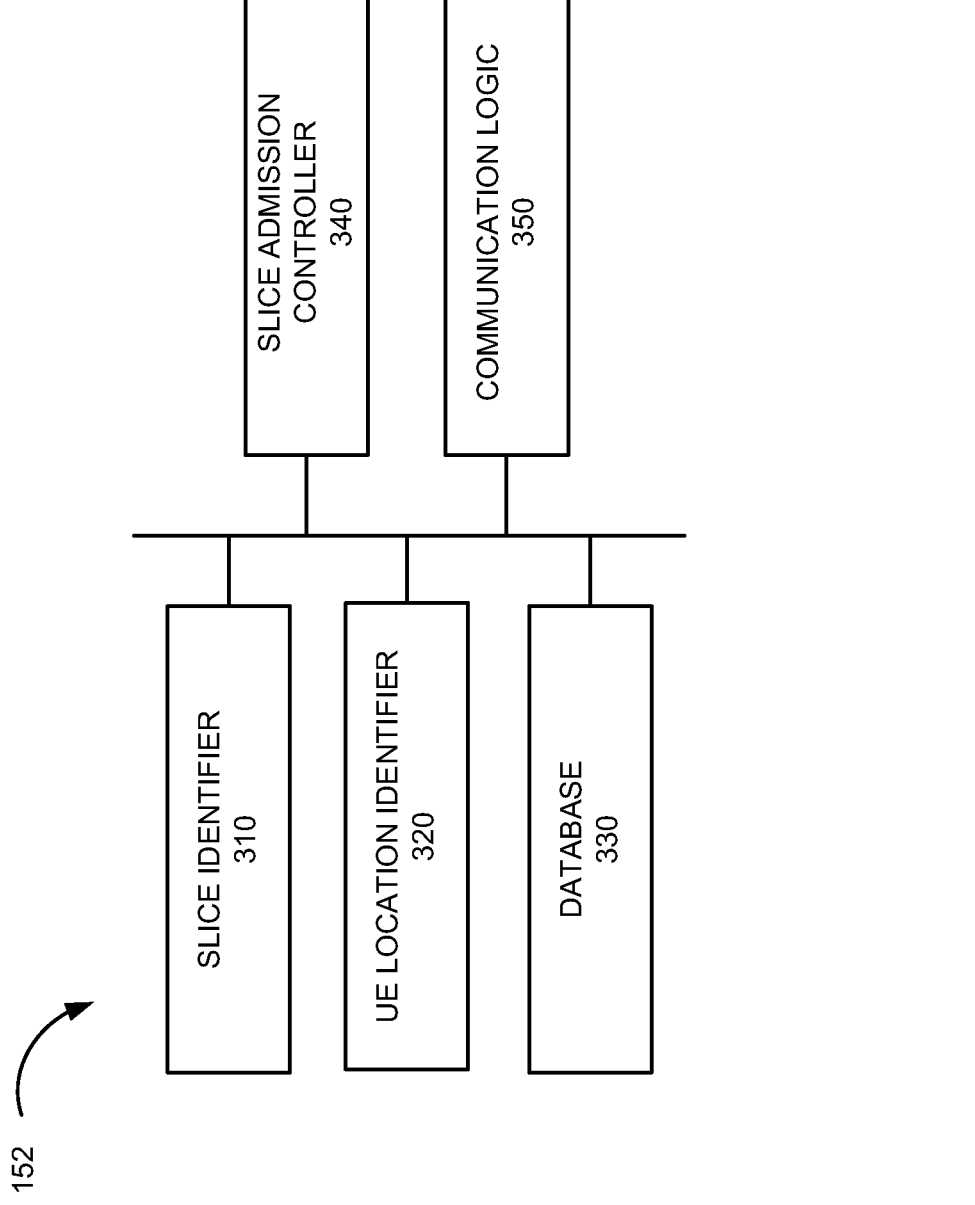
FIG. 3 illustrates logic components implemented in a Network Slice Admission Control Function (NSACF) in accordance with an exemplary implementation.

FIG. 3 is a block diagram of components implemented in NSACF 152 in accordance with an exemplary implementation. Referring to FIG. 3, NSACF 152 includes slice identifier 310, UE location identifier 320, database 330, slice admission controller 340 and communication logic 350. These elements may be implemented by processor 220 executing instructions stored in memory 230 of NSACF 152. In alternative implementations, these components or a portion of these components may be located externally with respect to NSACF 152.

Slice identifier 310 may include logic to identify slices implemented in environment 100. For example, slice identifier 310 may identify slices based on particular QoS, SLA requirements and/or key performance indicators (KPIs) associated with the slice, such as a slice having a high bandwidth and low latency, a slice having a medium bandwidth with fast convergence and low jitter, etc. In some implementations, each slice may be identified by a slice ID. The slice ID may correlate to a QoS, SLA or other metrics, such as a priority, associated with the slice. In an exemplary implementation, NSACF 152 may receive the slice information (e.g., slice IDs) from another network device, such as AMF 154, SMF 156, etc. In each case, slice identifier 310 may identify the slice IDs and/or other identifying information associated with the slice and store the slice IDs and/or other identifying information in database 330.

UE location identifier 320 may identify the location of a UE 110 that has sent a Registration message for establishing a data session, such as the cell in which the UE 110 is located, the sector in which UE 110 is located, the tracking area in which UE 110 is located, the registration area in which UE 110 is located, service area associated with UE 110, etc. In an exemplary implementation, NSACF 152 may receive the location information from another network device, such as AMF 154, SMF 156, etc. In each case, UE location identifier 320 may identify the location of a particular UE 110 and store the information in database 330. The location information may be used by NSACF 152 to perform admission control on a location-based determination, as described below.

Database 330 may store slice IDs, QoS, SLA, KPIs, priority information etc., associated with slices. For example, database 330 may store a slice ID, a priority, QoS and/or SLA requirements, as well as particular bandwidth, latency, jitter, etc., requirements for each slice used in environment 100. Database 330 may also store a maximum number of UE devices per slice per cell, sector, tracking area, registration area, service area, etc. Database 330 may also store a maximum number of PDU sessions, QoS data flows, 5QI data flows, etc., permitted for each slice per cell, sector, tracking area, registration area, service area, etc. Database 330 may further store location information, such as the particular cell, sector, tracking area, registration area service area, or some other area in which a UE 110 is located. This information may be used by NSACF 152 to perform admission control for data sessions, as described in detail below.

Slice admission controller 340 may include logic for determining whether a UE 110 can register for a slice or a data session can be serviced by a particular slice based on information stored in database 330. For example, slice admission controller 340 may determine whether a UE 110 can register for a network slice based on a maximum number of UE devices 110 permitted to register for the slice in a particular cell, sector, tracking area, registration area, service area, etc. The maximum number of UE devices 110 may be stored in database 330. Slice admission controller 340 may also determine whether a UE 110 can establish a PDU session based on a maximum number of PDU sessions that can be established per network slice for each cell, sector, tracking area, registration area, service area or for some other location/area. Slice admission controller 340 may further determine the number of QoS flows and/or the number QoS flows with a specific 5GIs that can be established for each network slice for each cell, sector, tracking area, registration area, service area, etc.

Communication logic 350 may include logic for communicating with devices in environment 100 via wired, wireless or optical mechanisms. For example, communication logic 350 may transmit data, such as admission control determinations to AMF 154, SMF 156 or other NFs in environment 100. Communication logic 350 may also receive information from devices in environment 100, such as devices in core network 150 providing information regarding slice information for slices implemented in environment 100. Communication logic 350 may also communicate with other devices in environment 100. For example, communication logic 350 may include one or more transceivers and one or more antennas for transmitting and receiving RF data, a modem or an Ethernet interface to a LAN or other mechanisms for communicating with elements in a network.

Although FIG. 3 shows exemplary components of NSACF 152, in other implementations, NSACF 152 may include fewer components, different components, differently arranged components, or additional components than depicted in FIG. 3. In addition, in other implementations, some or all of the components illustrated in FIG. 3 may be implemented in other devices, such as one or more other devices implemented in core network 150 or elsewhere in environment 100.

Figure 4:
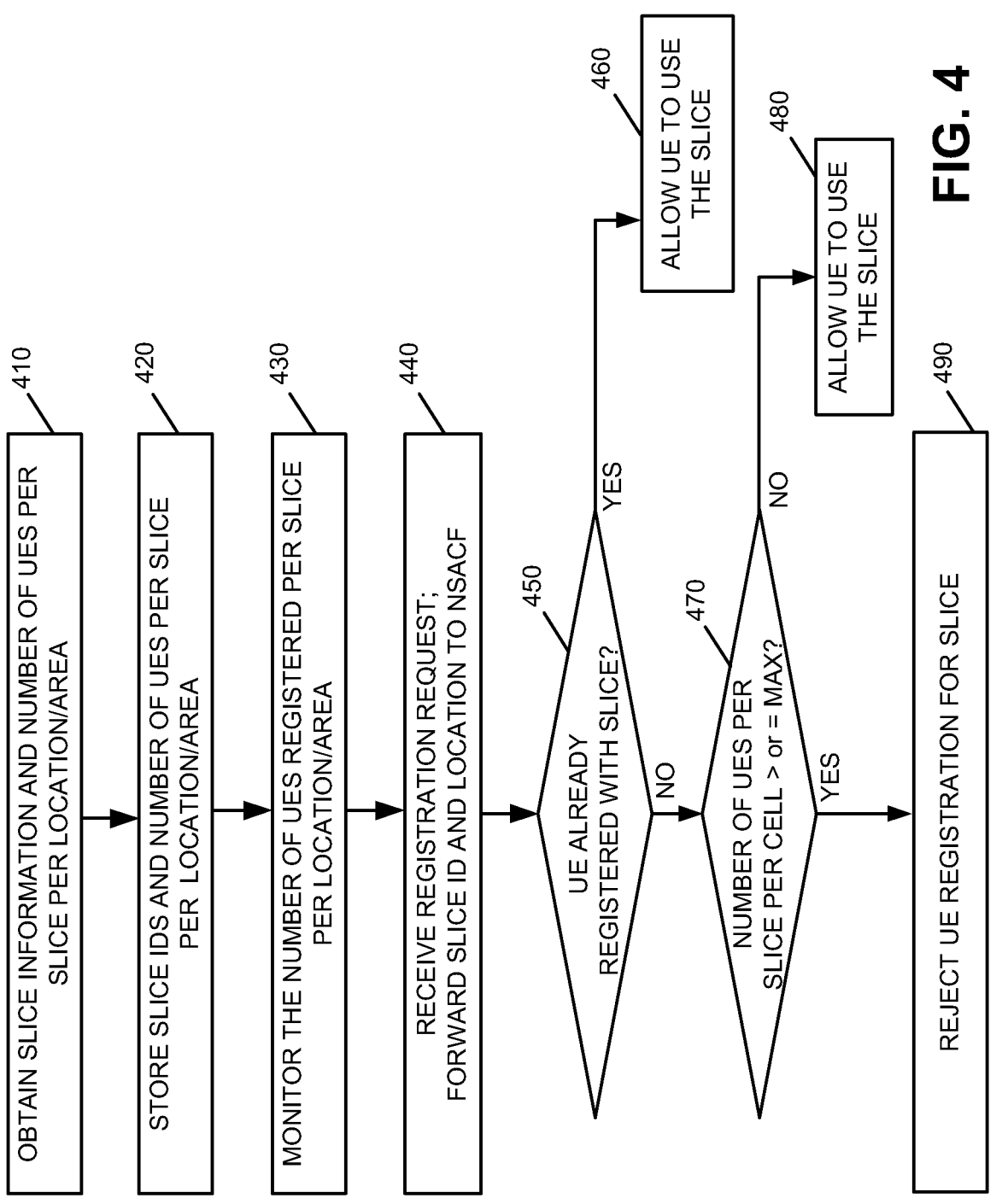
FIG. 4 is a flow diagram illustrating processing associated with slice based admission control in accordance with an exemplary implementation.

FIG. 4 is a flow diagram illustrating processing associated with slice-based access control in environment 100 in accordance with an exemplary implementation. Processing may begin with NSACF 152 obtaining information regarding slices used in environment 100 (block 410). For example, NSACF 152 may communicate with upstream devices in environment 100, such as devices in core network 150, to obtain information identifying slices used in environment 100. Alternatively, personnel associated with operating core network 150 may provide slice information to NSACF 152 for storage in NSACF 152. The slice information may include slice IDs associated with the slices used to transmit data to/from UE devices 110 from/to destinations in core network 150. The slice IDs may correspond to requirements associated with QoS, SLA, bandwidth, latency, jitter, etc.

NSACF 152 may also obtain information regarding the maximum number of UE devices 110 in a particular location that can register with each of the network slices, such as the number of UE devices per cell, sector, tracking area, registration area, service area, etc., that can register with each slice (block 410). This information may be obtained via personnel operating core network 150 and/or transport network 130, or by communicating with other devices in environment 100.

In each case, NSACF 152 may store the slice IDs and the number of UEs 110 that can register for each slice based on the location of the UEs 110 (block 420). For example, slice identifier 310 may store in database 330 the slice IDs and number of UEs 110 per cell, sector, tracking area, registration area, tracking area, etc., that can register with a slice.

NSACF 152 may also monitor the number of UE devices 110 currently registered with each slice based on, for example, the locations or areas in which the UE devices 110 are located (block 430). For example, NSACF 152 may monitor the number of UE devices 110 currently registered for each slice per cell, per sector, per tracking area, per registration area, per service area, etc., to ensure that the number of UE devices 110 registered for each location/area does not exceed the maximum number, as described below.

For example, assume that UE 110-1 transmits a Registration Request message to wireless station 122-1. Wireless station 122-1 may forward the request via transport network 130 to AMF 154 in core network 150. AMF 154 may identify a slice associated with UE 110-1 based on, for example, a QoS, SLA, etc., associated with UE device 110-1 and/or information provided by wireless stations 122-1. AMF 154 may also identify the location of UE 110-1, such as the cell, sector, tracking area, registration area and/or service area in which UE 110-1 is located based on, for example, information provided by wireless station 122-1. AMF 154 may forward the slice ID along with the location information to NSACF 152 (block 440).

NSACF 152 may receive the slice ID and location information and determine if UE 110-1 is already registered with the particular slice (block 450). For example, slice admission controller 340 may access database 330 and determine if the UE Identity associated with UE device 110-1 is already stored in a list of UEs 110 registered with the particular slice. If NSACF 152 determines that UE 110-1 is included in the list of UEs 110 registered with that particular network slice for that particular cell (block 450—yes), NSACF 152 allows the UE 110 to use that slice for the data session (block 460).

If, however, NSACF 110-1 determines that UE 110-1 is not identified in the list of UEs 110 already registered for the slice (block 450—no), slice admission controller 340 may access database 330 and determine if the number of UEs 110 registered for that particular slice in that particular cell is greater than or equal to the maximum number of registered UEs 110 that are allowed for the slice for the particular cell in which UE 110-1 is located (block 470). If the number of UEs 110 registered for that particular slice in the particular cell is less than the maximum number (block 470—no), NSACF 152 may allow UE 110-1 to register for service via the network slice (block 480). NSACF 152 may also increment the count of UEs registered for the particular cell by one.

If the number of UEs 110 in that particular cell already registered with the network slice is greater than or equal to the maximum (block 470—yes), NSACF 152 applies admission control policies to UE device 110-1. For example, NSACF 152 may reject the UE Registration Request for the particular slice (block 490). In this case, NSACF 152 may forward the rejection to AMF 154, but allow UE 110 to register and establish a data session without providing the data session via the requested network slice.

In this manner, NSACF 152 may perform admission control to limit the number of UE devices in a particular location/area that are permitted to use a slice. This enables the service provider to meet requirements associated with particular users of data services that are using network slices. Similar processing regarding determining whether the number of UEs 110 registered for a particular location/area exceeds a maximum number may be performed per sector, tracking area, registration area, service area or some other area/location.

In some implementations, NSACF 152 may perform admission control to limit the number of UE devices registered for a particular slice based on more than one of the cell, sector, tracking area, registration area, service area and/or other location/area. For example, NSACF 152 may determine if the number of UEs 110 registered for a particular cell is equal to a maximum number and also determine whether the number of UEs 110 registered for a particular tracking area is equal to a maximum number. If either the number of UEs 110 registered per cell or the number of UEs 110 registered per tracking area equals the respective maximum number, NSACF 152 may perform admission control and deny the UE 110 use of the network slice. In this manner, NSACF 152 may ensure that the number of registered UEs 110 for a slice based on more than one location/area associated with UEs 110 do not exceed the maximum numbers for those particular slices. In addition, the maximum number of UEs 110 permitted to be registered for a cell, sector, tracking area, registration and service area may be different.

As described above, NSACF 152 performs admission control with respect to the number of UEs 110 that can register for a particular slice. NSACF 152 also performs admission control regarding use of slices to ensure that a current number of PDU sessions per network slice per location/area does not exceed a predetermined number.

Figure 5:
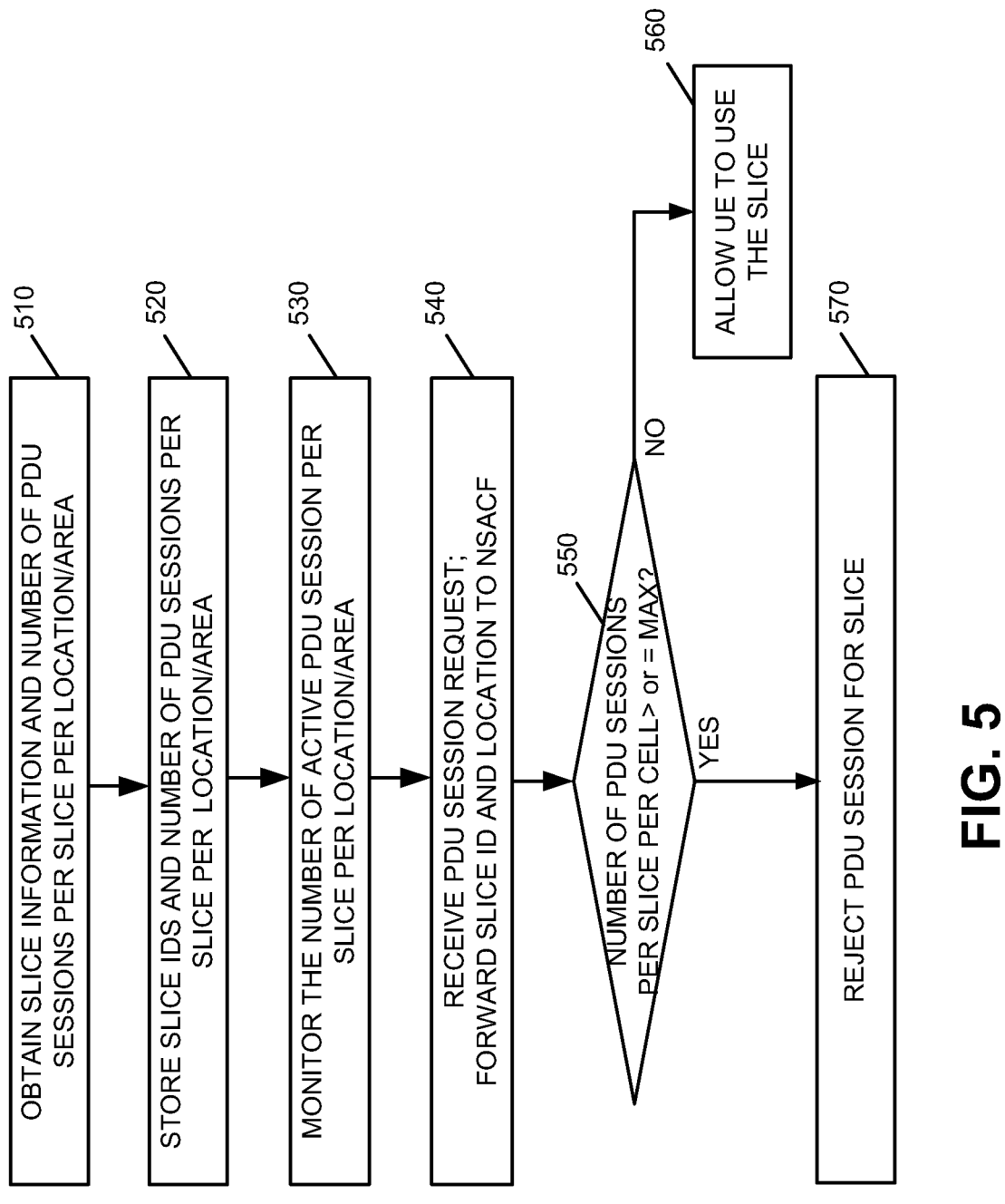
FIG. 5 is a flow diagram illustrating processing associated with slice based admission control in accordance with another exemplary implementation.

FIG. 5 is a flow diagram illustrating processing associated with slice-based access control in environment 100 in accordance with another exemplary implementation. Processing may begin with NSACF 152 obtaining information regarding slices used in environment 100 (block 510). For example, as discussed above with respect to FIG. 4, NSACF 152 may communicate with devices in environment 100, such as devices in core network 150, to obtain information identifying slices used in environment 100. Alternatively, personnel associated with operating core network 150 may provide slice information to NSACF 152 for storage in NSACF 152. The slice information may include slice IDs associated with the slices used to transmit data to/from UE devices 110 from/to destinations in core network 150.

NSACF 152 may also obtain information regarding the maximum number of PDU sessions allowed to be served by a slice in a particular location, such as the number of PDU sessions per cell, sector, tracking area, registration area, service area, etc., that can be served by each slice (block 510). This information may be obtained via personnel operating core network 150, or by communicating with other devices in environment 100.

In each case, NSACF 152 may store the slice IDs and the maximum number of PDU sessions that can be served by each slice based on the location of the UEs 110 (block 520). For example, slice identifier 310 may store in database 330 the slice IDs and number of PDU sessions per cell, sector, tracking area, registration area, tracking area, etc., that can be served by a slice.

NSACF 152 may also monitor the number of current PDU sessions served by each slice based on, for example, the locations or areas in which the UE devices 110 are located (block 530). For example, NSACF 152 may monitor the number of active PDU sessions for each slice per cell, per sector, per tracking area, per registration area, per service area, etc., to ensure that the number of active PDU sessions for each location/area does not exceed the maximum number, as described below.

Assume that UE 110-1 transmits a PDU Session Establishment Request to wireless station 122-1. Wireless station 122-1 may forward the request to SMF 156 in core network 150. SMF 156 may identify a slice associated with UE 110-1 based on, for example, a QoS, SLA, etc., associated with UE device 110-1 and/or information provided by wireless stations 122-1. SMF 156 may also identify location information associated with UE 110-1, such as the cell, sector, tracking area, registration area and/or service area in which UE 110-1 is located based on, for example, information provided by wireless station 122-1. SMF 156 may forward the slice ID along with the location information to NSACF 152 (block 540).

NSACF 152 may receive the slice ID and location information and determine if the number of PDU sessions for that particular slice in that particular cell is greater than or equal to the maximum number of PDU session that are allowed for the slice for the particular cell in which UE 110-1 is located (block 550). If the number of active PDU sessions for that particular slice in the particular cell is less than the maximum number (block 550—no), NSACF 152 may allow UE 110-1 to establish a PDU session to be served by the network slice (block 560). NSACF 152 may also increment the count of active PDU sessions for the particular cell by one.

If the number of PDU sessions in that particular cell is greater than or equal to the maximum (block 550—yes), NSACF 152 applies admission control policies to UE device 110-1. For example, NSACF 152 may reject the PDU session for the particular slice (block 570). In this case, NSACF 152 may forward the rejection to SMF 156, but allow UE 110 to establish a PDU session without providing the PDU session via the requested network slice.

In this manner, NSACF 152 may perform admission control to limit the number of active PDU sessions served by a slice to a maximum number of UEs 110 in a particular location. This enables the service provider to meet requirements associated with particular users of data services that are using network slices. Similar processing regarding determining whether the number of active PDU session for a particular location/area exceeds a maximum number may be performed for a sector, a tracking area, a registration area or a service area.

In some implementations, NSACF 152 may perform admission control to limit the number of active PDU session for a particular slice based on more than one of the cell, sector, tracking area, registration area, service area and/or other location/area. For example, NSACF 152 may determine if the number of active PDU sessions for UEs 110 in a particular sector is equal to a maximum number and also determine whether the number of UEs 110 registered for a particular registration area is equal to a maximum number. If either the number of active PDU sessions per sector or the number of active PDU sessions per registration area equal the respective maximum number, NSACF 152 may perform admission control and deny the UE 110 use of the network slice. In this manner, NSACF 152 may ensure that the number of active PDU sessions for a slice based on more than one location/area associated with UEs 110 do not exceed the maximum numbers for those particular slices. In addition, the maximum number of PDU sessions permitted for a cell, sector, tracking area, registration and service area may be different.

In the description above with respect to FIG. 5, NSACF 152 monitors and controls the number of active PDU sessions for each slice per cell, sector, tracking area, registration area and/or service area. In other implementations, NSACF 152 may monitor and control the number of active QoS flows or QoS flows having a particular 5QI for each slice per cell, sector, tracking area, registration area and/or service area. In this manner, NSACF 152 may perform location based admission control to limit the number of PDU sessions having different QoS flows or QoS flows having different 5QI values based on the cell, sector, tracking area, registration area and/or service area to provide additional granularity with respect to controlling use of slices in environment 100.

Implementations described herein provide location-based granularity with respect to the number of user devices or data sessions allowed for a network slice. This may allow a service provider to meet QoS, SLA and/or other requirements associated with network slices to as many as UEs 110 as possible. Providing location-based access control with respect to use of network slices may also prevent UE devices 110 in a particular area from using all the resources of a network slice while UE devices 110 located elsewhere may be prevented from using a particular network slice.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described above with respect to providing slice-based admission control via NSACF 152 located in core network 150. In other implementations, similar processing may be performed in transport network 130 and/or access network 120, and may be performed by other network functions.

In addition, in some implementations, NSACF 152 may perform the above described location based admission control in response to a particular event, such as a large number of UE devices 110 in a particular area requesting registration or attempting to establish a data session at approximately the same time. For example, a number of UE devices 110 may be located at a venue, such as a concert or sporting event, and may be attempting to establish data sessions at the same time. In some implementations, NSACF 152 may trigger the above described location based admission control in response to such an event.

Further, while series of acts have been described with respect to FIGS. 4 and 5, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   storing information identifying a plurality of network slices associated with transmitting data in a network;
   storing information identifying at least one of a maximum number of user equipment (UE) devices that can be registered for each network slice or a maximum number of data sessions that can be established for each network slice based on locations or areas associated with the UE devices;
   receiving, from a first UE device, a registration request or a request for a data session;
   identifying a first network slice associated with the first UE device;
   identifying a location or area associated with the first UE device, wherein identifying the location or area associated with the first UE device comprises identifying at least one of a cell, sector, tracking area, registration area or service area in which the first UE device is located; and
   determining, based on the identified location or area associated with the first UE device, whether at least one of a maximum number of UE devices that can be registered for the first network slice has been reached or a maximum number of data sessions that can be served by the first network slice has been reached, wherein the determining comprises:
   determining whether the maximum number of UE devices has been reached or the maximum number of data sessions has been reached based on the at least one of the identified cell, sector, tracking area, registration area or service area.

2. The method of claim 1, further comprising:
   applying an admission control policy to a data session for the first UE device, in response to determining that the maximum number of UE devices that can be registered for the first network slice or the maximum number of data sessions that can be served by the first network slice has been reached.

3. The method of claim 2, wherein the applying an admission control policy comprises:

providing a data session for the first UE device, wherein the data session does not use the first network slice.

4. The method of claim 1, wherein the determining comprises:

determining whether the maximum number of UE devices has been reached or the maximum number of data sessions has been reached based on at least two of the identified cell, sector, tracking area, registration area or service area.

5. The method of claim 1, further comprising:

receiving, from a second UE device, a registration request or a request for a data session;

identifying a second network slice associated with the second UE device; and determining, based on a location or area associated with the second UE device, whether a maximum number of data sessions having a first quality of service (QoS) that can be established for the second network slice has been reached.

6. The method of claim 1, further comprising:

receiving, from a second UE device, a registration request or a request for a data session;

identifying a second network slice associated with the second UE device; and determining, based on a location or area associated with the second UE device, whether a maximum number of data sessions associated with particular data session requirements that can be established for the second network slice has been reached.

7. The method of claim 1, wherein the determining is performed by a Network Slice Admission Control Function (NSACF).

8. The method of claim 7, further comprising:

receiving, by the NSACF, a network slice identifier and at least one of a cell identifier, sector identifier, tracking area identifier, registration area identifier or a service area identifier associated with the registration request or the request for a data session.

9. A device, comprising:

a memory configured to store information identifying a plurality of network slices associated with transmitting data in a network and information identifying at least one of a maximum number of user equipment (UE) devices that can be registered for each network slice or a maximum number of data sessions that can be established for each network slice based on locations or areas associated with the UE devices; and a processor configured to:

receive information identifying a first network slice associated with a registration request or a request for a data session for a first user equipment (UE) device, receive information identifying a location associated with the first UE device, wherein the information identifying a location comprises information identifying at least one of a cell, sector, tracking area, registration area or service area in which the first UE device is located, and determine, based on the identified location, whether at least one of a maximum number of UE devices that can be registered for the first network slice has been reached or a maximum number of data sessions that can be served by the first network slice has been reached, wherein when determining, the processor is configured to:

determine whether the maximum number of UE devices has been reached or the maximum number of data sessions has been reached based on the at least one of the identified cell, sector, tracking area, registration area or service area.

10. The device of claim 9, wherein the processor is further configured to:

generate an admission control decision for a data session for the first UE device, in response to determining that the maximum number of UE devices that can be registered for the first network slice or the maximum number of data sessions that can be served by the first network slice has been reached.

11. The device of claim 10, wherein the admission control decision indicates that the data session for the first UE device is not to use the first network slice.

12. The device of claim 9, wherein the information identifying a location comprises information identifying at least two of a cell, sector, tracking area, registration area or service area in which the first UE device is located, and when determining, the processor is configured to:

determine whether the maximum number of UE devices has been reached or the maximum number of data sessions has been reached based on at least two of the identified cell, sector, tracking area, registration area or service area.

13. The device of claim 9, wherein the processor is further configured to:

receive information identifying a second network slice associated with a registration request or a request for a data session, receive information identifying a location associated with the second UE device, and determine, based on the identified location, whether a maximum number of data sessions having a first quality of service (QoS) or a QoS having a Fifth Generation QoS identifier (5QI) that can be established for the second network slice has been reached.

14. The device of claim 9, wherein the device comprises a Network Slice Admission Control Function (NSACF).

15. The device of claim 9, wherein the processor is further configured to:

receive information identifying a second network slice associated with a second UE device; and determine, based on a location or area associated with the second UE device, whether a maximum number of data sessions having a first quality of service (QoS) that can be established for the second network slice has been reached.

16. A non-transitory computer-readable medium having stored thereon sequences of instructions which, when executed by at least one processor, cause the at least one processor to:

receive information identifying a first slice associated with a registration request or a request for a data session for a first user equipment (UE) device;

receive information identifying a location associated with the first UE device, wherein the information identifying a location comprises information identifying at least one of a cell, sector, tracking area, registration area or service area in which the first UE device is located; and determine, based on the identified location, whether at least one of a maximum number of UE devices that can be registered for the first slice has been reached or a maximum number of data sessions that can be served by the first slice has been reached, wherein when determining, the instructions cause the at least one processor to:

determine whether the maximum number of UE devices has been reached or the maximum number of data sessions has been reached based on the at least one of the identified cell, sector, tracking area, registration area or service area.

17. The non-transitory computer-readable medium of claim 16, wherein the instructions further cause the at least one processor to:

generate an admission control decision for a data session for the first UE device, in response to determining that the maximum number of UE devices that can be registered for the first slice or the maximum number of data sessions that can be served by the first slice has been reached.

18. The non-transitory computer-readable medium of claim 16, wherein the admission control decision indicates that the data session for the first UE device is not to use the first slice.

19. The non-transitory computer-readable medium of claim 16, wherein the instructions further cause the at least one processor to:

receive information identifying a second slice associated with a second UE device; and determine, based on a location or area associated with the second UE device, whether a maximum number of data sessions having a first quality of service (QoS) that can be established for the second slice has been reached.

20. The non-transitory computer-readable medium of claim 16, wherein the instructions further cause the at least one processor to:

receive information identifying a second slice associated with the second UE device; and determine, based on a location or area associated with the second UE device, whether a maximum number of data sessions associated with particular data session requirements that can be established for the second slice has been reached.

\* \* \* \* \*